United States Patent Office 3,208,596
Patented Sept. 28, 1965

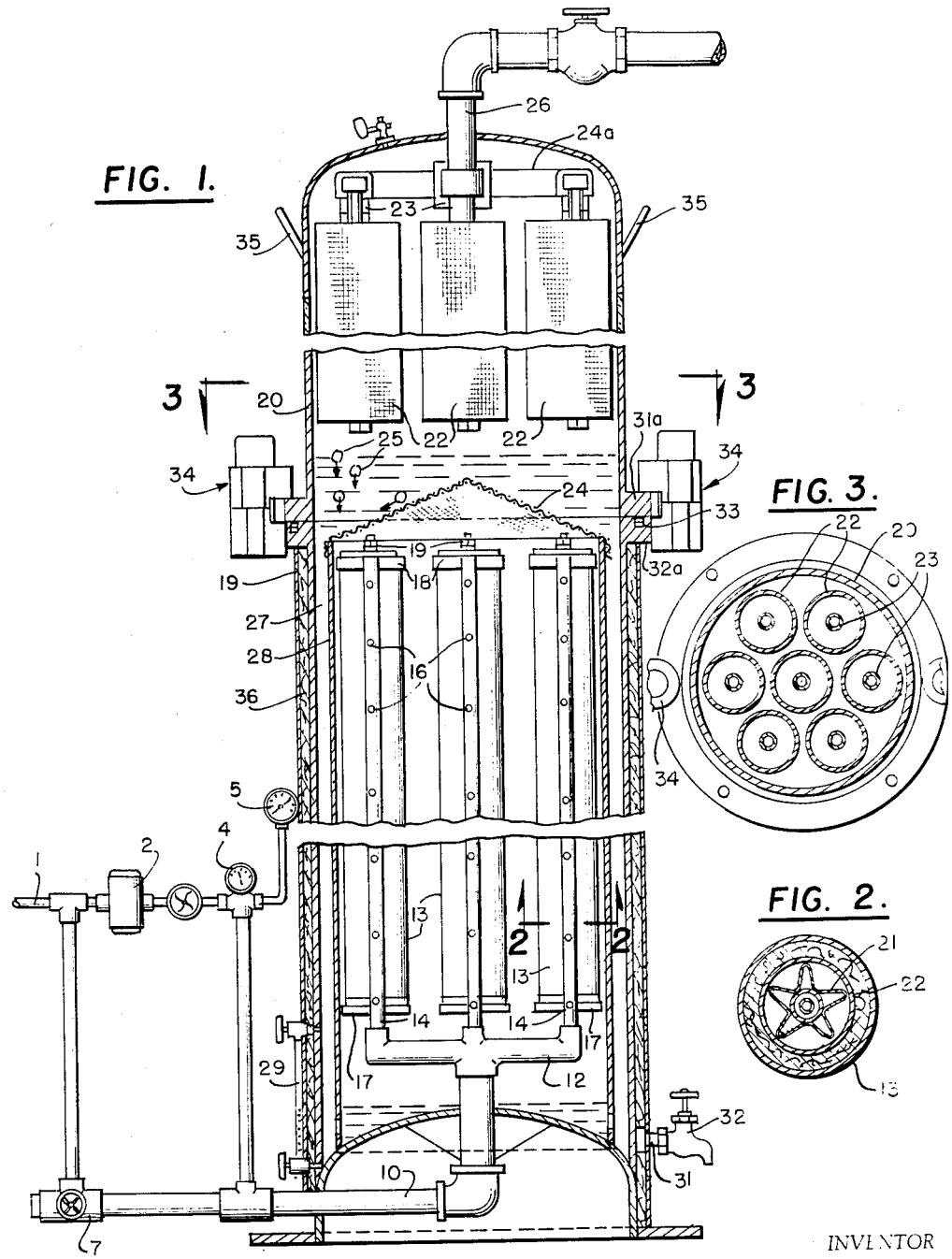

3,208,596
LUBRICATING OIL CLARIFIER AND COALESCER
William H. Gravert, Port Washington, N.Y., assignor to Marine Moisture Control Company, Inc., Inwood, N.Y., a corporation of New York
Filed Oct. 11, 1961, Ser. No. 144,429
7 Claims. (Cl. 210—307)

This invention relates to a filtering unit for clarifying lubricating oil by removal of both solid particulate impurities and also separation of minute water droplets from the oil, and has for its primary object the provision of a two-stage mechanical filter unit with special interaction between the stages to improve the efficiency and effectiveness of operation.

The use of multiple-stage filters of increasing fineness to clarify liquids is well known, and particularly the use of two-stage filters for separating both foreign particles and suspended water droplets from hydrocarbon liquids is also broadly old. However, where such filter units are to be permanently attached to a lubricating system, as in the case of marine equipment, compactness of the physical unit is obviously very desirable, yet it is ordinarily very difficult to achieve reasonable compactness together with high operating efficiency. A relatively coarse filter for the first stage is usually provided both to remove mechanical impurities in the form of small particles of dirt etc., and to achieve a certain degree of coalescence of the entrained minute water droplets into larger droplets which can be more easily handled. A second finer stage is often provided to remove most of these larger water droplets, which are then allowed to settle by gravity to the bottom of the filter housing or casing. If the unit is made small or compact, since a flow must be maintained through it in order to handle a reasonable amount of fluid, the water particles tend to be carried along by the flow and it is difficult to provide a quiet region through which they can settle by gravity. If space and expense are no factor, the apparatus can simply be put into a sufficiently large casing, but this obviously both increases the expense of the apparatus, and in marine installations, where space is at a premium, this is also prohibited by the space factor. The problem is less acute in the case of lighter hydrocarbons such as kerosene and gasoline used as fuel, because in this case the difference in specific gravity between the hydrocarbon and the water is very considerable, and the particles therefore sink more readily by gravity to the bottom of the housing or other space provided for them. However, in the case of heavier lubricating oils, this difference in specific gravity is smaller, thereby rendering the problem more acute, and this is further aggravated by the rate of viscosity of such oils.

It is a major object of the present invention to provide an efficient, yet compact clarifier and water coalescer for lubricating oils and similar heavy hydrocarbons which must be maintained in a very pure state for efficient operation. In the case of marine equipment, the oil is customarily continuously recirculated after purification, and the presence of even very minute quantities of water, in the order of one hundred parts per million, is detrimental. Even such small quantities of water tend to cause sludge, produce deterioration of the oil, combine with acid components in the oil and the atmosphere to corrode gears, and tend to accumulate in pockets of the mechanism by gravity action, to produce much higher local concentrations of water which are obviously more harmful. Since ordinary filters are relatively inefficient and bulky, it is customary, in marine installations, to use centrifugal separators which can be made quite compact, but which are expensive, require considerable maintenance because of the high operating speed, and are difficult to repair when out of order.

In accordance with the invention, a two-stage filter is provided, in which the second, or water-removing stage, is located vertically above the first stage, and a porous baffle provided between the two states, of such construction that the upward flow of fluid between the stages assists in separating the water particles produced by the second stage, and enabling them to efficiently settle, in a much smaller and more compact structure than heretofore possible.

The specific nature of my invention, as well as other objects and advantages thereof, will clearly appear from a description of a preferred embodiment as shown in the accompanying drawing, in which:

FIG. 1 is a schematic sectional elevation through a filter unit according to the invention;

FIG. 2 is a transverse sectional view showing a typical first-stage construction, taken on line 2—2 of FIG. 1; and FIG. 3 is a sectional view taken on line 3—3 of FIG. 1.

The apparatus of FIG. 1 is adapted to be attached in any convenient manner to the oil system of the equipment with which it is to be used, and is provided with an oil inlet 1, a positive displacement pump 2 such as a gear pump, an inlet thermometer 4 for indicating the temperature of the input oil, and a pump pressure gauge 5 to enable visual checking of the oil pressure. As the filters accumulate dirt, greater pressure is, of course, required to force the desired amount of oil through the system, and the condition of the filters can therefore be checked by reading the pump pressure guage 5. When this pressure exceeds a predetermined amount, due to continued accumulation of dirt in the filter, a pressure relief valve bypass 7 opens to prevent damage to the system, and permit return of the oil to the pump. Alternatively, the relief valve may bypass the entire filter in order to provide emergency maintenance of the oil, in systems where the filter is in series with the lubricating pressure system. These arrangements are well known, and do not form a part of the present invention. The oil passes down pipe 10 and up to a manifold 12 through which it is distributed in parallel to a number of identical coalescer-filter units 13. These are available commercial construction, and are compound units obtainable from the Pall Corporation of Glen Cove, Long Island, New York. Each unit fits over one of the vertical pipes 14 which are fixed to the manifold 12 and provided with a plurality of perforations 16 though which the oil passes to the unit. A collar 17 at the bottom of each pipe positions the unit vertically, and a similar removable collar 18 at the top is held down by a nut 19 which can be unscrewed for replacement of the unit upon the pipe 14; collars 17 and 18 also act as end cap seals to prevent oil leakage at these points. Each unit has a pleated paper-like section 21, as shown in FIG. 2, next to the pipe, for primary filtering of coarse material from the oil, and a secondary filter portion 22 for further filtration, and to assist in coalescing the water droplets entrained in the oil into larger droplets. The filter portion 22 is preferably formed of glass wool, preferably in the form of rigid sheets so that they do not tend to settle and leave a void space at the top of the unit.

When the oil passes through units 13, it is substantially clean of all solid material, and most of the water has been coalesced into larger droplets than originally. Since there is a substantial flow of fluid through the unit, the flow current carries the fluid including the entrained water droplets upward to the surface of screen separators 22 through which the oil passes to pipes 23 which are connected to the second header 24a, and thence to outlet pipe 26.

Separator screens 22 are made of rigid sintered material having extremely fine pores in the order of 10 microns average opening size. A preferred type may be obtained from the Pall Corporation of Glen Cove, Long Island, New York. These screen separators are substantially completely hydrophobic, and will allow only oil to go through the mesh. The water, therefore, accumulates on the surface of the filter into still larger drops which coalesce until they become sufficiently large to drop down by gravity against the counter-current flow of the oil in the casing. The drops of water descend until they strike the surface of screen mesh 24, which is a cone of coarse screen having pores sufficiently large to permit the finer droplets rising from filters 13 to pass through them, but are sufficiently fine so that the larger droplets descending from filters 22 do not pass through them. In practice, 16-mesh screen has been found suitable. In operation, the descending large droplets 25 appear to just barely touch the upper surface of cone screen 24, from which they are repelled to some extent by the rising current of fluid through the screen, and roll or slide down the inclined surface of the cone until they fall off the edge into dead annular space 27 provided by a tubular baffle 28 of solid construction, which also serves to support the lower edge of cone 24. Since the baffle 28 serves to shield the fluid in space 27 from the upward flow of current of fluid passing through filters 13, the oil in annular space 27 is relatively quiescent and without turbulence and the drops 25 therefore readily fall through this space to the bottom of the tank or casing where they remain by gravity separation. When a sufficient amount of water has accumulated, as indicated by sight glass 29 provided for the purpose, the water can be drawn off through outlet 31 by means of tap 32. It will be understood that since the amount of water originally entrained in the oil is often very small, the water accumulates quite slowly, and the tap therefore does not need frequent attention. However, in some instances, there may be considerable extraneous water in the oil, and this will also be removed, in some cases at the rate of, for example, three or four gallons per day for each gallon per minute capacity of the unit. When these conditions are encountered, it is, of course, necessary to drain off the water more frequently, and on shipboard, this can be done routinely at each watch.

The tank or casing is preferably made in two halves respectively shown at 19 and 20, separable at flange portion 31a, 32a, provided with a circular gasket 33 for sealing purposes, and preferably clamped together as shown at 34 by means of a cam locking arrangement as shown in my U.S. Patent No. 2,996,318, issued August 15, 1961, for Cam Operated Quick Acting Pipe Coupler, although any other type of fastening construction may be employed. When the pressure gauge 5 indicates the need for replacement of the filters 13, the oil is drained from the tank, the upper half 20 is removed, suitable handles 35 being provided for the purpose, and the filters 13 may then readily be replaced. It is not necessary to replace the filters 22, since these do not in practice accumulate any dirt upon their surface, although, if desired, the surface may be wiped to ensure its clean condition.

An insulating jacket 36 is provided around the lower tank portion, in order to assist in maintaining the oil within the tank at a uniform temperature and to prevent heat loss. In these installations, it is desired that the oil be maintained at an inner temperature of from 140°–160° F. for proper operation in the lubricating system. This also assists in the operation of the filter, since the higher temperature reduces the viscosity of the oil and enables the water droplets to fall more readily through the oil. The jacket also acts to maintain a uniform temperature gradient in the tank and to minimize thermal eddies which tend to interfere with the fall of the droplets.

By virtue of the above construction, and especially because of the action of baffle 28 is providing a quiet annular space 27, the entire filter unit can be built much more compactly than would otherwise be possible for handling a given rate of oil flow through the cleaner. The valve-like action of screen cone 24 in permitting the small droplets to flow upwards while separating the larger droplets, enables a small, compact unit to remove a relatively large amount of water and provides an output of highly purified oil meeting all practical requirements.

It will be apparent that the embodiments shown are only exemplary, and that various modifications can be made in construction and arrangement within the scope of my invention as defined in the appended claims.

I claim:

1. In a filtering device for removing free water and solid contaminants from a liquid hydrocarbon, a fluid-tight housing having inlet means for passing hydrocarbon into said housing, first-stage filter means in said housing for receiving hydrocarbon fluid from said inlet means and initially coalescing free water in said hydrocarbon fluid into fine droplets, second-stage hydrophobic filter means in said housing vertically above and in fluid communication with said first-stage filter means for passing hydrocarbon fluids and further coalescing said water into larger drops which descend in said fluid within the housing outlet means for passing oil from said second-stage filter means out of the device, inclined perforated screen means between said first and second filter means having perforations sufficiently large to pass most of the initially coalesced water as it flows upward within the surrounding hydrocarbon fluid from said first to said second filter means, said perforations being sufficiently small so that said drops cannot descend therethrough, and means at the lower portion of said inclined perforated screen means providing a quiescent zone for the accumulation and settling of said larger drops.

2. The invention according to claim 1, said last means including baffle means between said housing and said first-stage filter means to provide a quiescent fluid zone, said inclined screen means sloping down toward said quiescent zone to direct said larger droplets into said quiescent fluid zone.

3. The invention according to claim 2, said baffle means being generally vertical and open at the bottom to provide fluid interconnection between the bottom of the housing and the bottom of said quiescent zone.

4. The invention according to claim 3, and fluid drain means at the bottom of said housing to drain off accumulated water.

5. The invention according to claim 3, and thermal insulating means surrounding at least the lower portion of said housing to maintain a constant fluid temperature within the housing, minimize thermal currents, and keep viscosity of oil low to accelerate the downward movement of water drops.

6. The invention according to claim 5, and fluid outlet means leading from said second-stage filter means.

7. The invention according to claim 3, said first-stage filter means including mechanical filter means for removing solid contaminants from said hydrocarbon fluids.

References Cited by the Examiner

UNITED STATES PATENTS

| | | | |
|---|---|---|---|
| 2,861,689 | 11/58 | Lyall | 210—175 |
| 3,027,009 | 3/62 | Price | 210—316 |
| 3,048,275 | 8/62 | Headrick. | |
| 3,064,818 | 11/62 | Kasten | 210—316 |

REUBEN FRIEDMAN, *Primary Examiner.*

GEORGE D. MITCHELL, HERBERT L. MARTIN,
*Examiners.*